United States Patent [19]

Ogawa et al.

[11] Patent Number: 4,510,203

[45] Date of Patent: Apr. 9, 1985

[54] MAGNETIC RECORDING MEDIUM

[75] Inventors: Hiroshi Ogawa; Chiaki Mizuno; Yasuo Tamai, all of Kanagawa, Japan

[73] Assignee: Fuji Photo Film Co., Ltd., Kanagawa, Japan

[21] Appl. No.: 500,709

[22] Filed: Jun. 3, 1983

[30] Foreign Application Priority Data

Jun. 3, 1982 [JP] Japan ................................ 57-95244

[51] Int. Cl.³ .............................................. G11B 5/70
[52] U.S. Cl. ................................ 428/425.9; 252/62.54; 360/134; 360/135; 360/136; 427/128; 427/131; 428/480; 428/522; 428/483; 428/694; 428/900
[58] Field of Search ................. 252/62.54; 428/425.9, 428/694, 695, 900, 522, 480, 483; 427/131, 128; 360/134-136

[56] References Cited

U.S. PATENT DOCUMENTS 4,340,644  7/1982  Ota et al. ............................ 428/694

FOREIGN PATENT DOCUMENTS 53-26993  3/1978  Japan .............................. 252/62.54

Primary Examiner—Ellis P. Robinson
Attorney, Agent, or Firm—Sughreu, Mion, Zinn, Macpeak and Seas

[57] ABSTRACT

A magnetic recording medium is disclosed which is comprised of a non-magnetic support having thereon a magnetic layer comprising a ferromagnetic powder dispersed in a binder. The binder is comprised of a copolymer of vinyl chloride-vinyl acetate-vinyl alcohol and a copolymer of ethylene-vinyl acetate which is graft-polymerized with vinyl chloride and, optionally, a polyisocyanate. The recording medium has excellent electromagnetic properties, running properties and durability.

13 Claims, No Drawings

MAGNETIC RECORDING MEDIUM

FIELD OF THE INVENTION

This invention relates to a magnetic recording medium and more particularly to a magnetic recording medium having excellent running properties and durability.

BACKGROUND OF THE INVENTION

A magnetic recording medium, particularly an audio-cassette recording tape has recently been used for recording music, and has been required, therefore, to have better frequency characteristics and better reproducing ability of original sounds. Further, products such as a car stereo and a radio with an audio cassette recorder are becoming more popular which causes an increase in demand for a tape having good running properties and durability.

In a video-cassette tape recording system, the wavelength to be recorded is made shorter, and the track width is made narrower to achieve high density recording. Therefore, it is necessary for a tape to have high output level and reproducing ability of an original image with high S/N ratio. It is also necessary for a recording tape for a video tape recorder (VTR) with the increase of commercial use of portable VTR that a total thickness of video tapes becomes 20 μm or thinner and running properties and durability of the tapes have to be far better than conventional video tapes. That is, audio tapes and video tapes having more excellent electromagnetic properties, running properties and durability are strongly desired.

Various binder compositions have been proposed to improve the above properties in, for example, U.S. Pat. Nos. 2,607,710, 3,247,017, 3,650,828, 4,152,484, 3,049,442, 3,144,352, 3,149,996, 3,242,005, 3,262,813, 3,437,510, 3,472,798, 3,808,136, 3,865,741, 3,911,196, 3,926,826, 4,000,336, 4,049,871, 4,058,646, and 4,154,895. However those which completely satisfy the above requirement have not been obtained.

For example, a mixture of a copolymer of vinyl chloride/vinyl acetate/other vinyl compound and a urethane rubber type resin is mainly used as a binder in view of dispersibility of a ferromagnetic powder, and running properties and durability of a magnetic layer. Useful copolymers of vinyl chloride/vinyl acetate/other vinyl compound include a copolymer of vinyl chloride/vinyl acetate/vinyl alcohol, a copolymer of vinyl chloride/vinyl acetate/maleic anhydride and the like. Particularly a copolymer of vinyl chloride/vinyl acetate/vinyl alcohol is often used, since the copolymer has excellent dispersibility with respect to ferromagnetic powders.

A conventional copolymer of vinyl chloride/vinyl acetate/vinyl alcohol is composed of 91 to 95 wt% of vinyl chloride, 3 to 6 wt% of vinyl acetate and 2 to 3 wt% of vinyl alcohol. This copolymer is commercially available under the trade name "VAGH" manufactured by Union Carbide Co., Ltd., "S-LEC-A" manufactured by Sekisui Kagaku Kogyo Co., Ltd., and "Denka vinyl 1000G" manufactured by Denki Kagaku Kogyo Co., Ltd. However, where this type of copolymer of vinyl chloride/vinyl acetate/vinyl alcohol is used, flexibility of a magnetic layer is short. Therefore, a large amount of a plasticizer needs to be added or a large amount of a soft resin needs to be added. However, where a large amount of a plasticizer is used, blooming readily occurs, or durability of a magnetic layer is decreased. Where a large amount of polyurethane resin is used in combination, dispersibility of ferromagnetic powders is degraded and running properties are also degraded at high temperature and high humidity.

Accordingly, it has been difficult to obtain a medium having sufficiently excellent running properties and durability by the use of the combination of a conventional copolymer of vinyl chloride/vinyl acetate/vinyl alcohol and a polyurethane resin.

SUMMARY OF THE INVENTION

A first object of the invention is to provide a novel magnetic recording medium.

A second object of the invention is to provide a magnetic recording medium having excellent electromagnetic properties.

A third object of the invention is to provide a magnetic recording medium having excellent running properties and durability.

The above objects of the invention can be attained by using a binder comprising a copolymer of vinyl chloride-vinyl acetate-vinyl alcohol, a copolymer of ethylene-vinyl acetate in which vinyl chloride is graft-polymerized, and optionally a polyisocyanate compound.

DETAILED DESCRIPTION OF THE INVENTION

The copolymer of vinyl chloride-vinyl acetate-vinyl alcohol used in the invention is composed, preferably of 60 to 97 wt% of vinyl chloride, 0 to 30 wt% of vinyl acetate and 3 to 15 wt% of vinyl alcohol, and more preferably of 80 to 90 wt% of vinyl chloride, 0 to 10 wt% of vinyl acetate and 5 to 10 wt% of vinyl alcohol in view of good dispersibility of ferromagnetic powders. Polymerization degree of the copolymer is preferably 200 to 700 and more preferably 300 to 500. If the polymerization degree is not higher than about 200, the copolymer readily heat-decomposes. If the polymerization degree is not lower than 700, it is difficult for the copolymer to be dissolved in a solvent, and as a result, poor dispersion of ferromagnetic powders is obtained. A molecular weight distribution (MW/MN) is preferably 1.0 to 3.0.

The copolymer of ethylene-vinyl acetate used in the invention is a copolymer mainly composed of 90 to 30 wt%, preferably 80 to 40 wt%, of ethylene and 10 to 70 wt%, preferably 20 to 60 wt%, of vinyl acetate, which is further graft-polymerized with 20 to 90 wt%, preferably 40 to 80 wt%, of vinyl chloride based on the ethylene-vinyl acetate copolymer. Polymerization degree of the graft copolymer is preferably 300 to 3,000 and more preferably 500 to 2,000. The molecular weight distribution (MW/MN) is preferably 1.0 to 3.0. The copolymer of ethylene-vinyl acetate which is further graft-polymerized with vinyl chloride is commercially available under the trade name "Sumigraft" manufactured by Sumitomo Kagaku Kogyo Co., Ltd.

Polyisocyanate used in the invention includes a reaction product of 1 mole of trimethylol propane and 3 moles of diisocyanate such as tolylenediisocyanate, xylenediisocyanate, hexamethylenediisocyanate and the like; a buret adduct product of 3 moles of hexamethylenediisocyanate; an isocyanurate adduct product of 3 moles of tolylenediisocyanate and 2 moles of hexamethylenediisocyanate; a polymer compound of diphenylmethanediisocyanate; isophorone diisocyanate and the like.

These compounds are commercially available under the following trade names "Coronate L", "Coronate HL", "Coronate 2030", "Milionate MR" and "Milionate MTL" which are manufactured by Nihon Polyurethane Co., Ltd.; "Desmodule L", "Desmodule N", "Desmodule IL" and "Desmodule HL" which are manufactured by Sumitomo Bayer Urethane Co., Ltd., "Takenate D-102", "Takenate D-110N" and "Takenate D-202" which are manufactured by Takeda Pharmaceutical Industries Co., Ltd.

The weight ratio of copolymer of vinyl chloride-vinyl acetate-vinyl alcohol to copolymer of ethylene-vinyl acetate which is graft-polymerized with vinyl chloride is preferably about 80/20 to 10/90 and more preferably 60/40 to 20/80. If the amount of copolymer of vinyl chloride-vinyl acetate-vinyl alcohol is more than about 80 wt%, the magnetic layer lacks flexibility and accordingly it does not completely adhere to the support. If the amount of copolymer of ethylene-vinyl acetate which is graft-polymerized with vinyl chloride is more than about 90 wt%, the dispersibility of ferromagnetic powders is decreased.

Where polyisocyanate is employed in combination, about 1 to 40 wt% of polyisocyanate is preferably used and about 5 to 30 wt% is more preferably used based on the above mixed compounds. If polyisocyanate is used in an amount of not more than about 1 wt%, the magnetic layer is not hardened. If polyisocyanate is used in an amount of not less than 40 wt%, the magnetic layer lacks flexibility.

The binder is generally used in an amount of 10 to 100 wt%, preferably 15 to 50 wt% and more preferably 18 to 30 wt% based on ferromagnetic powders. If the amount is not more than 10 wt%, ferromagnetic powders readily fall off from the magnetic layer. If the amount is not less than 100 wt% the electromagnetic properties are decreased.

A plasticizer, a stabilizer and a lubricant can be used in combination in the invention. Details of these additives are disclosed in *Vinyl Chloride Resins*, published by Nikkan Kogyo Press, Japan.

The magnetic recording medium of the invention is prepared by coating on a support a magnetic composition containing the binder, ferromagnetic powders and additives dispersed in an organic solvent and drying.

Preferred ferromagnetic powders include $\gamma$-$Fe_2O_3$, $Fe_3O_4$, Co-modified iron oxide and an alloy powder mainly composed of iron.

Details of ferromagnetic powders, additives, organic solvents, and dispersing and coating methods are disclosed in U.S. Pat. Nos. 4,135,016, 4,201,809 and 4,110,503.

The invention will be explained in more detail by the following Examples, but the scope of the invention should not be limited to the Examples. In the Examples, "part" means "part by weight".

| | |
|---|---|
| $\gamma$-$Fe_2O_3$ (Hc 400 Oe, acicular ratio 10/1, average particle length 0.4 $\mu$m) | 100 parts |
| A copolymer of vinyl chloride/vinyl acetate/vinyl alcohol ("S-LEC-A" manufactured by Sekisui Kagaku Co., Ltd.) | Amount as shown in Table 1 |
| A copolymer of ethylene/vinyl acetate which is graft-polymerized with vinyl chloride ("Sumigraft" manufactured by Sumitomo Kagaku Co., Ltd. | Amount as shown in Table 1 |
| Oleic acid | 2 parts |
| *-continued* | |
| Dimethylpolysiloxane (polymerization degree: about 60) | 0.5 part |
| Butyl acetate | 250 parts |

The above compositions were mixed and kneaded in a ball mill for 48 hours and filtrated by a filter having an average pore diameter of 3 $\mu$m to obtain a magnetic coating composition.

Thus obtained coating composition was coated on a 7 $\mu$m-thick polyethylene terephthalate film in a dry thickness of 5 $\mu$m by a reverse roll, which was then subjected to magnetic orientation by an electromagnet of 1000 gauss and was dried. The magnetic layer was subjected to super-calender roll treatment to make the surface of the magnetic layer smooth, slit to a width of 3.81 mm to obtain audio cassette tapes (Philips type compact cassette). The characteristics of the tapes thus obtained are shown in Table 1, Nos. 1 to 6.

COMPARATIVE EXAMPLE 1

The same procedure as in Example 1 was repeated using a conventional polyurethane resin ("CRISVON 7209" manufactured by Dainihon Ink Kagaku Co., Ltd.) instead of the copolymer of ethylene/vinyl acetate which is graft-polymerized with vinyl chloride to obtain audio cassette tapes. The characteristics of the tapes thus obtained are shown in Table 1, Nos. C-1 to C-5. (C-No.: comparative sample)

EXAMPLE 2

| | |
|---|---|
| Co-coated berthollide iron oxide (Co 3.0 atomic % coating, FeO 1.4, Hc 660 Oe, acicular ratio 10/1, average particle length 0.4 $\mu$m) | 100 parts |
| A copolymer of vinyl chloride/vinyl acetate/vinyl alcohol ("S-LEC-A" manufactured by Sekisui Kagaku Co., Ltd.) | Amount as shown in Table 2 |
| A copolymer of ethylene/vinyl acetate which is graft-polymerized with vinyl chloride ("Sumigraft GF" manufactured by Sumitomo Kagaku Co., Ltd.) | Amount as shown in Table 2 |
| Oleic acid | 2 parts |
| 2-Ethylhexyl stearate | 0.5 part |
| $\alpha$-Alumina (average diameter 0.5 $\mu$m) | 4 parts |
| Butyl acetate | 250 parts |

The above compositions were mixed, kneaded and dispersed in a ball mill, added with a polyisocyanate compound ("Coronate L-75" manufactured by Nihon Polyurethane Co., Ltd.), in an amount (solid content) as shown in Table 2 and then mixed, kneaded and dispersed for 1 hour. The compositions were filtrated by a filter having an average pore diameter of 1 $\mu$m to obtain a coating composition for a magnetic layer. Thus obtained magnetic composition was coated on a 14 $\mu$m-thick polyethylene terephthalate film in a dry thickness of 5 $\mu$m by a reverse roll, subjected to magnetic orientation treatment with a magnet of 3000 gauss under the undried state and then dried. The thus obtained magnetic layer was subjected to super calender roll treatment to smooth the surface thereof and slit to a width of ½ inch to obtain video cassete tapes (VHS type cassette). The characterisitics of thus obtained tapes are shown in Table 2, Nos. 7 to 9.

COMPARATIVE EXAMPLE 2

The same procedure as in Example 2 was repeated except using polyurethane resin ("CRISVON 7209" manufactured by Dainihon Ink Co., Ltd.) instead of a copolymer of ethylene/vinyl acetate which was graft-polymerized with vinyl chloride obtain video cassette tapes. The results are shown in Table 2, Nos. C-6 to C-8.

EXAMPLE 3

The same procedure as in Example 2 was repeated except using Fe-Zn alloy fine powder (Fe:Zn=95:5, Hc 1300 Oe, acicular ratio 10/1, average particle length 0.3 μm) instead of co-coated bertholide iron oxide in Example 2 to obtain video cassette tapes. The characteristics of the video tapes are shown in Table 2, Nos. 10 and 11.

COMPARATIVE EXAMPLE 3

The same procedure as in Comparative Example 2 was repeated to provide video cassette tapes except that a Fe-Zn alloy fine metal powder (Fe:Zn=95:5, Hc 1300 Oe; Acicular ratio 10/1; average particle length 0.3 μm) was used instead of Co-coated berthollide iron oxide. The characteristics of the thus obtained video recording tapes are shown as Nos. C-9 to C-10 in Table 2.

The various tape characteristics indicated in Tables 1 and 2 were measured by the following methods:

Measurement method (a) MOL 313:

The maximum output at 315 Hz (distortion degree 3%) was measured with a cassette tape deck "582" manufactured by Nakamichi Co., Ltd. using "Fuji Cassette ER C-90" manufactured by Fuji Photo Film Co., Ltd. as a reference tape that was assumed to produce an output of 0 dB.

(b) SOL 10K:

The saturated output at 10 KHz was measured where the reference tape was assumed to deliver an output of 0 dB.

(c) Audio tape running properties:

Tape running tests were conducted at 25° C., 50% RH and at 40° C., 80% RH with 100 commercial cassette tape decks to see how orderly the tape samples could be wound, and the results were evaluated.

A . . . could be wound orderly on all decks
B . . . could not be wound orderly on 1 to 5 decks
C . . . could not be wound orderly on 5 to 10 decks.
D . . . could not be wound orderly on 11 or more decks (d) Lowering of level;

TABLE 1

| Sample No. | Vinyl Chloride/ Vinyl Acetate/ Vinyl Alcohol Copolymer (wt %) | Graft Copolymer* (wt %) | Polyester type Polyurethane Resin (wt %) | MOL 315 (dB) | SOL 10K (dB) | Audio running Properties | Lowering of Level | Stain | Tape Squeal |
|---|---|---|---|---|---|---|---|---|---|
| Example 1 | | | | | | | | | |
| 1 | 22.5 | 2.5 | — | 0.2 | 0.2 | A | A | A | A |
| 2 | 17.5 | 7.5 | — | 0.2 | 0.3 | A | A | A | A |
| 3 | 12.5 | 12.5 | — | 0.5 | 0.6 | A | A | A | A |
| 4 | 18 | 2 | — | 0.7 | 0.2 | A | A | A | A |
| 5 | 14 | 6 | — | 0.9 | 0.5 | A | A | A | A |
| 6 | 10 | 10 | — | 1.0 | 0.6 | A | A | A | A |
| Comparative Example 1 | | | | | | | | | |
| C-1 | 25 | — | — | −0.7 | −0.6 | C | C | C | A |
| C-2 | — | 25 | — | 0.8 | 0.8 | A | A | B | B |
| C-3 | 22.5 | — | 2.5 | 0.5 | 0.7 | A | A | B | B |
| C-4 | 17.5 | — | 7.5 | 0.6 | 0.8 | A | A | B | B |
| C-5 | 12.5 | — | 12.5 | 0.8 | 1.0 | B | B | C | C |

*Ethylene/vinyl acetate copolymer which is graft-polymerized with vinyl chloride.

TABLE 2

| Sample No. | Vinyl Chloride/ Vinyl Acetate/ Vinyl Alcohol copolymer (wt %) | Graft Copolymer* (wt %) | Polyurethane Resin (wt %) | Polyisocyanate Compound (wt %) | Video Output (dB) | S/N Ratio (dB) | Video Running Properties | D.O. Increase | Still Life | Tape Squeal |
|---|---|---|---|---|---|---|---|---|---|---|
| Example 2 | | | | | | | | | | |
| 7 | 17.5 | 7.5 | — | 2.5 | 0.4 | 0.2 | A | A | A | A |
| 8 | 15.0 | 7.5 | — | 5.0 | 0.5 | 0.4 | A | A | A | A |
| 9 | 12.5 | 7.5 | — | 7.5 | 0.6 | 0.3 | A | A | A | A |
| Comparative Example 2 | | | | | | | | | | |
| C-6 | 17.5 | — | 7.5 | 2.5 | 0.4 | 0.3 | A | A | A | B |
| C-7 | 15.0 | — | 7.5 | 5.0 | 0.7 | 0.5 | A | A | A | B |
| C-8 | 12.5 | — | 7.5 | 7.5 | 0.9 | 0.6 | A | B | B | C |
| Example 3 | | | | | | | | | | |
| 10 | 15.0 | 7.5 | — | 5.5 | 7.6 | 3.3 | A | A | A | A |
| 11 | 12.5 | 7.5 | — | 7.5 | 8.1 | 3.5 | A | A | A | A |
| Comparative Example 3 | | | | | | | | | | |
| C-9 | 15.0 | — | 7.5 | 5.0 | 7.9 | 3.8 | A | A | A | B |
| C-10 | 12.5 | — | 7.5 | 7.5 | 8.6 | 4.1 | B | B | B | B |

*Ethylene-vinyl acetate copolymer which is graft-polymerized with vinyl chloride Lowering of output level at 10 KHz was evaluated at the same time with the evaluation of audio tapes running properties.

A . . . less than 3 dB
B . . . less than 6 dB
C . . . less than 9 dB
D . . . not less than 9 dB (e) Stain:

After evaluation of the tape running properties, the head of each deck was checked for the presence of stain.

A . . . Stain was absent or hardly detectable.
B . . . Some but negligible stain
C . . . Considerable stain (f) Tape squeal:

The presence of tape squeal was checked during the tape running tests.

A . . . No tape squeal was heard.
B . . . Occasional squeals were heard on 1 to 2 cassette tapes.
C . . . Occasional squeals were heard on 3 to 5 cassette tapes.
D . . . Occasional squeals were heard on not less than 5 casette tapes and continuous tape squeals were heard on not less than 1 to 2 tape cassettes.

(g) Video output:

The output at 4 MHz was measured using "NV-6600" manufactured by Matsushita Electric Industrial Co., Ltd. using a VHS tape manufactured by Fuji Photo Film Co., Ltd. as a reference tape that was assumed to deliver an output of 0 dB.

(h) S/N ratio:

The S/N ratio at 10 KHz to 4 MHz after visibility correction was measured with "NV-6600" manufactured by Matsushita Electric Co., Ltd.

(i) Video running properties:

Video tape running property tests were conducted with 50 commercial VHS video tape decks at 25° C., 50% RH and at 40° C., 80% RH to see if any jitter or skew occurred, and the results are shown below.

A . . . No jitter or skew
B . . . Some but insignificant jittering or skewing
C . . . Frequent jittering or skewing caused a problem.

(j) D.O. increase:

Increase of D.O. was measured at the mesurement of video tape running properties.

A . . . Increase by less than 10 occurrences per 1 minute.
B . . . Increase by less than 20 occurrences per 1 minute.
C . . . Increase by less than 30 occurrences per 1 minute,
D . . . Increase by not less than 30 occurrences per 1 minute.

(i) Still life:

The time (min.) for a serious defect to occur in a picture reproduced in a still mode was measured using "NV-6600" manufactured by Matsushita Electric Industrial Co., Ltd.

(l) Tape squeal:

The same as the tape squeal as shown in the item (f).

In accordance with table 1 it is clear that audio cassette tape Nos 1 to 6 using a copolymer of ethylene/vinyl acetate which is graft-polymerized with vinyl chloride in the invention are more excellent in the audio tape running properties, lowering of level, stains, tape squeals and durability than the tape No. C-1 contaning no graft copolymer of the invention and the tape Nos. C-3 to C-5 using a conventional polyurethane resin and that the former are similar to the latter in MOL 315 and SOL 10K.

Tapes using a conventional polyurethane resin have a little higher MOL and SOL and good electromagnetic properties but have some problems with regard to running properties and durability.

Accordingly, it is understood that a magnetic recording medium having the same or better electromagnetic properties, excellent running properties and durability can be obtained by using the graft copolymer of the invention.

In accordance with Table 2 it is clear that video tape Nos. 7 to 11 using ethylene/vinyl acetate copolymer which is graft-polymerized with vinyl chloride in the invention are more excellent than video tape Nos. C-6 to C-10 in video running properties, increase of dropout, still life, tape squeals, and durability and that the formers are similar to latters in video output and S/N ratio.

It is clear from the above Examples and Comparative Examples that a magnetic recording medium having more excellent running properties and durability can be obtained by using a binder containing an ethylene/vinyl acetate copolymer which is graft-polymerized with vinyl chloride in the invention and that the binder containing the graft copolymer of the invention has nearly the same electromagnetic properties as a binder containing conventional polyurethane resin.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a flexible magnetic layer comprising a ferromagnetic powder dispersed in a binder showing good dispersibility for the ferromagnetic powder, said binder comprising a copolymer of vinyl chloride-vinyl acetate-vinyl alcohol and a copolymer of ethylene-vinyl acetate which is graft-polymerized with vinyl chloride wherein said copolymer of vinyl chloride-vinyl acetate-vinyl alcohol is composed of 60 to 97 wt% of vinyl chloride up to 30 wt% of vinyl acetate and 3 to 15 wt% of vinyl alcohol and said copolymer of ethylene-vinyl acetate graft-polymerized with vinyl chloride is an ethylene-vinyl acetate copolymer composed of 90 to 30 wt% of ethylene and 10 to 70 wt% of vinyl acetate, which is further graft-polymerized with 20 to 90 wt% of vinyl chloride based on the ethylene-vinyl acetate copolymer.

2. A magnetic recording medium as claimed in claim 1, wherein said binder further comprises a polyisocyanate wherein the polyisocyanate is present in an amount within the range of 1 to 40 wt%.

3. A magnetic recording medium as claimed in claim 1, wherein said copolymer of vinyl chloride-vinyl acetate-vinyl alcohol is composed of 80 to 90 wt% of vinyl chloride, up to 10 wt% of vinyl acetate and 5 to 10 wt% of vinyl alcohol.

4. A magnetic recording medium as claimed in claim 1, wherein said copolymer of vinyl chloride-vinyl acetate-vinyl alcohol has a polymerization degree within the range of 200 to 700.

5. A magnetic recording medium as claimed in claim 4, wherein said copolymer of vinyl chloride-vinyl acetate-vinyl alcohol has a polymerization degree within the range of 300 to 500.

6. A magnetic recording medium as claimed in claim 1, wherein said copolymer of vinyl chloride-vinyl acetate-vinyl alcohol has a molecular weight disturibution (MW/MN) within the range of 1.0 to 3.0.

7. A magnetic recording medium as claimed in claim 1, wherein said copolymer of ethylene-vinyl acetate graft-polymerized with vinyl chloride is an ethylene-vinyl acetate copolymer composed of 80 to 40 wt% of ethylene and 20 to 60 wt% of vinyl acetate, which is further graft-polymerized with 40 to 80 wt% of vinyl chloride based on the ethylene-vinyl acetate copolymer.

8. A magnetic recording medium as claimed in claim 1, wherein said copolymer of ethylene-vinyl acetate graft-polymerized with vinyl chloride has a polymerization degree within the range of 300 to 3,000.

9. A magnetic recording medium as claimed in claim 8, wherein said copolymer of ethylene-vinyl acetate graft-polymerized with vinyl chloride has a polymerization degree within the range of 500 to 2,000.

10. A magnetic recording medium as claimed in claim 1, wherein said copolymer of ethylene-vinyl acetate graft-polymerized with vinyl chloride has a molecular weight distribution (MW/MN) within the range of 1.0 to 3.0.

11. A magnetic recording medium as claimed in claim 1, wherein the weight ratio of the copolymer of vinyl chloride-vinyl acetate-vinyl alcohol to the copolymer of ethylene-vinyl acetate graft-polymerized with vinyl chloride is within the range of 80/20 to 10/90.

12. A magnetic recording medium as claimed in claim 11, wherein the weight ratio of the copolymer of vinyl chloride-vinyl acetate-vinyl alcohol to the copolymer of ethylene-vinyl acetate graft-polymerized with vinyl chloride is within the range of 60/40 to 20/80.

13. A magnetic recording medium as claimed in claim 2, wherein the polyisocyanate is present in an amount within the range of 5 to 30 wt%.

* * * * *